United States Patent [19]

Noguchi et al.

[11] Patent Number: 4,790,487
[45] Date of Patent: Dec. 13, 1988

[54] CONTINUOS GRANULATOR

[75] Inventors: Tetsuo Noguchi; Masao Tanaka, both of Shizuoka; Hiroshi Nakanishi, Fujieda, all of Japan

[73] Assignee: Kabushiki Kaisha Okawara Seisakusho, Shizuoka, Japan

[21] Appl. No.: 70,959

[22] Filed: Jul. 8, 1987

[30] Foreign Application Priority Data

Jul. 9, 1986 [JP] Japan ................................ 61-161523

[51] Int. Cl.$^4$ ............................................ B02C 23/22
[52] U.S. Cl. .................... 241/79.1; 209/283; 209/474; 241/97; 427/213
[58] Field of Search ...................... 241/50, 97, 1, 79.1, 241/24, 19, 301, 275, 5, 59, 40, 57; 427/213; 209/283, 474, 475, 466, 324, 321, 358, 247, 263; 110/245, 348; 34/57 A; 159/DIG. 3; 198/661, 666, 671, 674, 675; 118/DIG. 5; 366/101, 107

[56] References Cited

U.S. PATENT DOCUMENTS

| 590,538 | 9/1897 | Davis | 209/474 |
| 2,711,387 | 6/1955 | Matheson et al. | 209/474 X |
| 2,729,598 | 1/1956 | Garbo | 209/474 X |
| 3,251,467 | 5/1966 | Bakke | 209/283 X |
| 3,856,217 | 12/1974 | Brewer | 241/79.1 |

FOREIGN PATENT DOCUMENTS 1033235 8/1983 U.S.S.R. ................................ 209/474

Primary Examiner—Mark Rosenbaum
Attorney, Agent, or Firm—Bruce L. Adams; Van C. Wilks

[57] ABSTRACT

A continuous granulator includes a granulator body for continuously processing powdered materials into granules, and a screw conveyor for discharging the produced granules from the granulator body, the screw conveyor including a pneumatic classifier for separating or classifying the produced granules while they are being conveyed. The pneumatic classifier includes a porous lower portion of the screw conveyor which permits passage of streams of pressurized air therethough into the interior of the screw conveyor. With this construction, discharging conveyance of the produced granules and classification of the produced granules can be carried out concurrently at the same station and hence the granules of a uniform grain size can be produced at an increased rate.

25 Claims, 3 Drawing Sheets

CONTINUOS GRANULATOR

BACKGROUND OF THE INVENTION

1. Field of the Invention:

The present invention relates to an apparatus for continuously processing powdered materials into grains or granules for the production of medicines, foodstuffs or the like. Such apparatus is hereinafter referred to as a "continuous granulator".

2. Prior Art:

There have been proposed numerous types of continuous granulators constructed to process powdered materials to continuously produce grains or granules. The proposed granulators generally include a discharge conveyor for the delivery of the treated or produced granules from the inside of the granulator. The produced granules are then fed into a separator or classifier by means of which only the granules of a desired grain size are collected as a final product.

The known granulators are satisfactory in that the final product has a relatively uniform grain size. On the other hand, the known granulators have a drawback that the productivity is low since the granulation, discharge and classification processes are carried out successively at separate processing stations.

SUMMARY OF THE INVENTION

With the foregoing drawback of the known apparatus in view, it is an object of the present invention to provide a continuous granulator with which powdered materials can be continuously processed into grains or granules of a uniform size at an increased rate of production.

According to the present invention, the foregoing and other objects are attained by a continuous granulator comprising a granulator body for continuously processing powdered materials into granules, and a screw conveyor for discharging the produced granules from the granulator body, the screw conveyor including means for pneumatically classifying the produced granules while they are being conveyed. The pneumatic classifying means comprises a porous lower portion of the screw conveyor which permits passage of streams of pressurized air therethough into the interior of the screw conveyor.

With this construction, the discharging process and the classifying process are carried out concurrently at the same station and hence the production rate is substantially increased. Another advantage is that since the classifier is incorporated in the screw conveyor, the granulator is compact and simple in construction as a whole.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
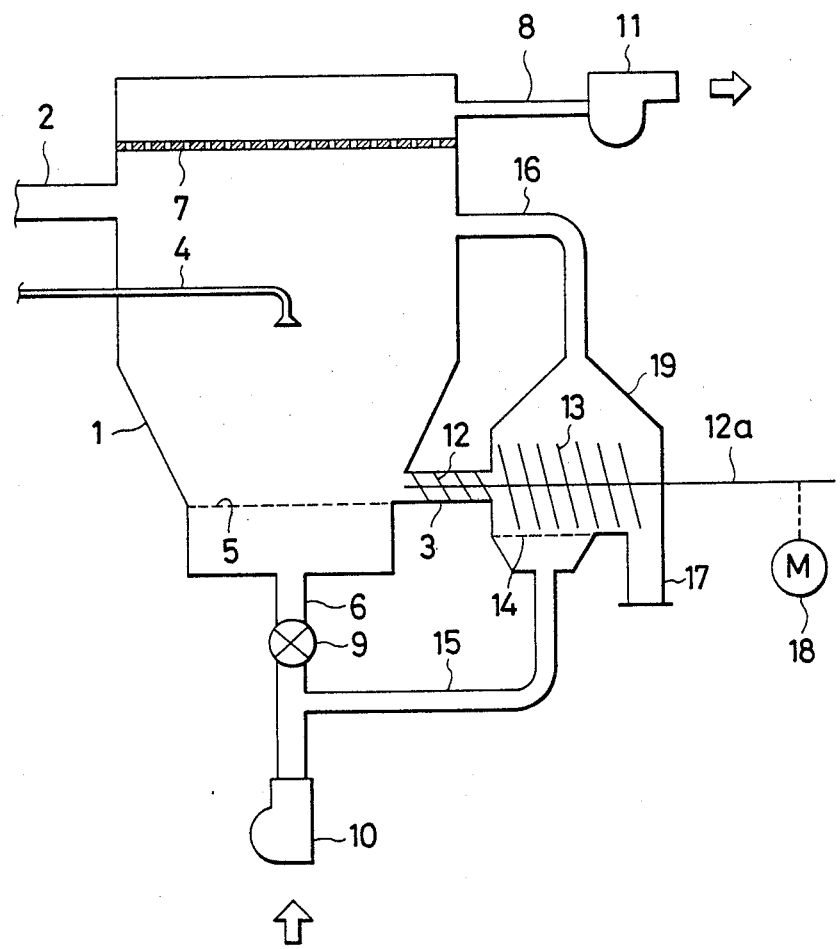
FIG. 1 is a diagrammatic view showing the general construction of a continuous granulator according to the present invention.

FIG. 1 diagrammatically shows the general construction of a continuous granulator apparatus embodying the present invention. The granulator apparatus generally comprises a first stage for continuously processing powdered materials into granules, and a second stage for pneumatically separating granules of a given classified size from the other granules and ungranulated powdered materials.

The first stage is in the form of a fluidized chamber 1 which includes an upper inlet port 2 through which starting powdered materials are introduced into the chamber 1, a lower outlet or discharge channel 3 through which produced grains or granules are discharged from the chamber 1, and a spray nozzle 4 disposed in the chamber 1 for spraying a suitable solution of binder or other agent toward a porous bottom slab 5 of the chamber 1, the porous bottom slab 5 being formed of a perforated plate or a woven wire cloth. The bottom wall of the fluidized chamber 1 is connected with a blower pipe 6. A filter 7 is disposed in the fluidized chamber 1 at a position above the inlet port 2 and defines with the chamber 1 an upper interior portion to which a suction pipe 8 is connected. The blower pipe 6 is connected through a valve 9 with a blower 10 while the suction pipe 8 is connected with a suction blower 11.

With the fluidized chamber 1 thus constructed, starting powdered materials are loaded into the fluidized chamber 1 through the inlet port 2 while introducing a carrier fluid, namely air, gas, hot air, or hot gas into the chamber 1 through the blower pipe 6. At the same time, a solution of binder or other agent is sprayed toward the porous bottom slab 5. The loaded powdered materials are suspended or fluidized by a vertically rising stream of carrier fluid which is blown into the chamber 1 through the porous bottom slab 5. The vertically rising stream of carrier fluid imparts to the powdered materials an appearance of great turbulence with which stirring of the powdered materials is promoted. Thus, the powdered materials come into intimate contact to thereby form grains or granules.

The produced granules fall by their own weight and are then discharged from the chamber 1 through discharge channel 3. The suction blower 11 produces a negative pressure in the chamber 1 by means of which stirring of the powdered materials is further promoted. The filter 7 permits only the passage of the fluid toward the suction pipe 8 while blocking passage of the powdered materials.

The screw conveyor includes a first screw 12 rotatably disposed in the discharge channel 3, and a second screw 13 connected end-to-end with the first screw 12 and extending downstream of the first screw 12. The first and second screws 12, 13 are attached to a common horizontal shaft 12a which is driven by an electric motor 18. The first screw 12 is composed of a general short pitch helical screw and is used solely for conveyance of the granules toward the second screw 13. The second screw 13 is larger in diameter than the first screw 12 and comprises a ribbon screw or a paddle screw which includes bars or paddles (not shown) connected to the shaft 12a. The second screw 13 thus constructed makes it ideal for separation or classification of the produced granules while they are being conveyed.

The second screw 13 is rotatably disposed in the second stage of the apparatus which comprises a stationary separation chamber or casing 19 connected at its one end (left end in FIG. 1) with a discharge end of the discharge channel 3. The chamber or casing 19 includes a flat porous bottom member 14 underlying the second screw 13. The porous bottom member may be made of the same material as the porous bottom slab 5 of the fluidized chamber 1. The bottom portion of the casing 19 is connected with the blower 10 through a blower pipe 15 while the upper portion of the casing 19 is connected with the fluidized chamber 1 through a return conduit or passage 16. In the illustrated embodiment, the blower pipe 15 is branched from the blower pipe 6 for enabling a common use of the blower 10. However, it is possible to provide a separate blower for forcing the fluid to flow through the blower pipe 15 into the casing 19. The fluid is usually air or gas, but when a final drying of the granules is required, hot air or hot gas may be used.

With the screw conveyor thus constructed, the pressurized fluid is fed through the porous bottom member 14 into the casing 19 and then flows upwardly across the second screw 13 with the result that the granules are classified while they are conveyed by the second conveyor 13. During that time, ungranulated powdered materials and undersized granules are scattered upwardly and flow back into the fluidized chamber 1 for re-use as the fluid flows from the casing 19 through the return passage 16 to the chamber 1. The granules are finally discharged from the screw conveyor through an outlet port 17 of the casing 19. With the pneumatic classification thus carried out, the discharged granules have a highly uniform grain size.

Figure 2:
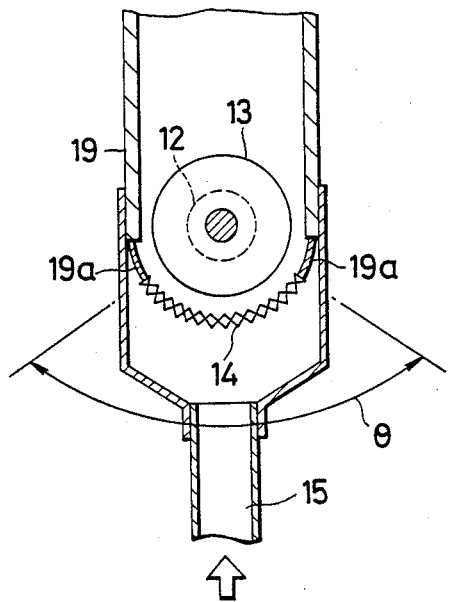
FIG. 2 is an enlarged cross-sectional view of a discharge conveyor of the granulator shown in FIG. 1.

A modified screw conveyor shown in FIG. 2 is similar to the screw conveyor shown in FIG. 1 but differs therefrom in that the separation chamber or casing 19 includes an arcuate trough-like porous bottom member 14 connected to opposite lower side edges of the casing 19 via a pair of elongate connecting strips 19a, 19a. The arcuate porous bottom member 14 is downwardly spaced a distance from the second screw 13 and extends around a lower peripheral portion of the second screw 13. It has been experimentally proved that the lower peripheral portion of the second screw 13 circumferentially extends preferably through an angle $\theta$ of 30-120 degrees, and the ratio of the outside diameter of the first screw 12 to the outside diameter of the second screw 13 is preferably 1:1.5-1:5.

Figure 3:
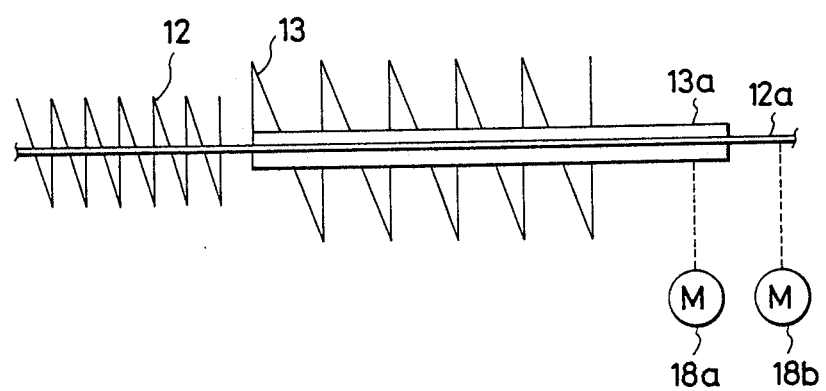
FIG. 3 is a diagrammatic view of a modified screw element according to the present invention.

FIG. 3 shows a modified screw element which is composed of a first screw 12 attached to a shaft 12a, and a second screw 13 secured to a hollow shaft 13a and driven by an electric motor 18a operatively coupled with the shaft 13a. The shaft 12a extends concentrically through the hollow shaft 13a and is driven by an electric motor 18b. With this arrangement, the speed of rotation of the second screw 13 can be adjusted independently from the speed of first screw 12 so that the granules while being conveyed are sufficiently stirred and classified. Thus, the uniformity in grain size of the final granular product is substantially improved.

Figure 4:
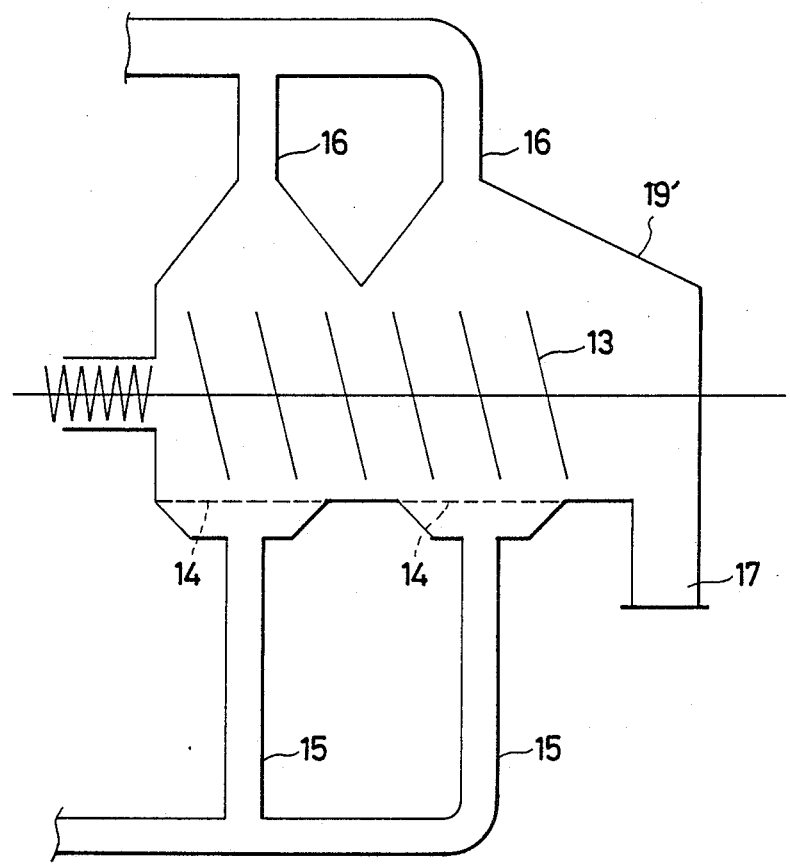
FIG. 4 is a fragmentary diagrammatic view showing a modified discharge conveyor according to the invention.

A modified screw conveyor shown in FIG. 4 is similar to the screw conveyor of FIG. 1 but differs therefrom in that two-stage classification of the produced granules can be attained. To this end, the screw conveyor includes a pair of spaced porous bottom members 14, 14 disposed in series in a separation chamber or casing 19' at a position below the second screw 13. A non-illustrated blower forces a fluid to flow through a pair of branched blower pipes 15, 15 into the casing 19. The fluid is then forced respectively through the porous bottom members 14, 14 and flows across the granules while they are conveyed by the second screw 13. Finally, the fluid flows through a pair of blanched return passage 16, 16 to the fluidized chamber 1, not shown. With this arrangement, an improved degree of classification and drying of the granules is achievable.

Unlike the prior granulators in which a separate classifier, such as a mechanical sieve is provided additional to the discharge conveyor, the continuous granulator of the present invention includes a screw conveyor having a pneumatic classifier. The present granulator is therefore compact and simple in construction. Furthermore, classification of the produced granules and discharge conveyance of the produced granules are carried out concurrently at the same station with the result that the rate of production is greatly increased.

Obviously, many modifications and variations of the present invention are possible in the light of the above teachings. For example, the principle of the present invention is also useful when embodied in a granulator body of the type which is different from the illustrated fluidized chamber. It is therefore to be understood that within the scope of the appended claims, the invention may be practiced otherwise than as specifically described.

What is claimed is:

1. Apparatus for continuously processing powdered materials into granules of a given classified size, comprising: a fist stage having means for continuously processing powdered materials into granules; first conveying means for continuously conveying granules and ungranulated powered materials from the first stage; and a second stage connected to continuously receive the conveyed granules and ungranulated powdered materials and having pneumatic separating means for pneumatically separating granules of a given classified size from the other granules and ungranulated powdered materials, means for returning the other granules and ungranulated powdered materials to the first stage for re-use, and second conveying means for continuously conveying the granules of given classified size through the second stage for discharge from the apparatus.

2. Apparatus according to claim 1; wherein the pneumatic separating means comprises a porous lower portion of said second conveying means which permits passage of streams of pressurized air therethrough into the interior of said second conveying means.

3. Apparatus according to claim 2; said porous lower portion of said second conveying means being separated into a plurality of porous parts in the conveying direction of said second conveying means.

4. Apparatus according to claim 2; said second conveying means including a screw rotatably disposed therein, said porous lower portion of said second conveying means being flat and underlying said screw.

5. Apparatus according to claim 2; said second conveying means including a screw rotatably disposed therein, said porous lower portion of said second conveying means being arcuate and extending around a lower peripheral portion of said screw.

6. Apparatus according to claim 5; said lower peripheral portion of said screw extending circumferentially through an angle of 30-120 degrees.

7. Apparatus according to claim 1; said first conveying means including a first screw disposed adjacent to said first stage, and said second conveying means including a second screw disposed immediately downstream of said first screw.

8. Apparatus according to claim 7; said pneumatic separating means comprising a porous lower portion of said second conveying means underlying said second screw.

9. Apparatus according to claim 8; said porous lower portion of said second conveying means being separated into a plurality of porous parts in the conveying direction of said second conveying means.

10. Apparatus according to claim 8; said porous lower portion of said second conveying means being flat.

11. Apparatus according to claim 8; said porous lower portion of said second conveying means being arcuate and extending around a lower peripheral portion of said second screw.

12. Apparatus according to claim 11; said lower peripheral portion of said second screw extending circumferentially through an angle of 30-120 degrees.

13. Apparatus according to claim 7; said first screw comprising a helical screw, said second screw comprising a ribbon screw.

14. Apparatus according to claim 7; said first screw comprising a helical screw, said second screw comprising a paddle screw.

15. Apparatus according to claim 7; said second screw having an outside diameter greater than the outside diameter of said first screw.

16. Apparatus according to claim 15; the ratio of the outside diameter of said first screw to the outside diameter of said second screw being 1:1.5-1:5.

17. Apparatus according to claim 7; said first and second screws being attached to a single shaft.

18. Apparatus according to claim 7; said first screw being attached to a first shaft and driven by a first motor coupled with said first shaft, said second screw being attached to a hollow second shaft and driven by a second motor coupled with said second shaft, said first shaft extending concentrically through said hollow second shaft.

19. Apparatus according to claim 1; comprising a fluidized chamber having a discharge channel through which the produced granules are discharged from said fluidized chamber; said first conveying means including a first screw rotatably disposed in said discharge channel, said second conveying means including a second screw disposed immediately downstream of said first screw, and a casing connected with said discharge channel and rotatably receiving therein said second screw; said pneumatic separating means comprising a porous lower portion of said casing and a blower for forcing a fluid through said porous lower portion into said casing.

20. Apparatus according to claim 19; including means connecting said blower with said fluidized chamber for feeding the fluid thereinto.

21. Apparatus according to claim 19; said means for returning comprising a return passage connecting together said casing and said fluidized chamber.

22. Apparatus according to claim 1; wherein the first and second conveying means comprise first and second rotary screw conveyors disposed in end-to-end relation such that the first screw conveyor conveys the granules and ungranulated powdered materials directly to the second screw conveyor.

23. Apparatus according to claim 2; wherein the first stage includes a fluidized chamber having a discharge opening which communicates with an upstream portion of the first screw conveyor and through which granules and ungranulated powdered materials flow to the first screw conveyor; and the second stage includes a separation chamber having an inlet opening which communicates with a downstream portion of the first screw conveyor and in which are disposed the second screw conveyor and the pneumatic separating means, and an outlet opening through which granules of given classified size are discharged.

24. Apparatus according to claim 3; wherein the means for returning the other granules and ungranulated powdered materials comprises a return conduit interconnecting the fluidized and separation chambers.

25. Apparatus according to claim 23; wherein the first and second screw conveyors have first and second screws disposed coaxially with one another, the outside diameter of the second screw being 1.5 to 5 times greater than that of the first screw.

* * * * *